United States Patent [19]
Cerwall et al.

[11] Patent Number: 6,157,839
[45] Date of Patent: Dec. 5, 2000

[54] METHODS OF INITIATING A RECONFIGURING OF A CELL IN A MOBILE RADIO NETWORK

[75] Inventors: Carl Patrik Cerwall, Tyresö ; Anna Helleberg, Sollentuna, both of Sweden

[73] Assignee: Telefonaktiebolaget LM Ericsson, Stockholm, Sweden

[21] Appl. No.: 09/169,936

[22] Filed: Oct. 13, 1998

[30] Foreign Application Priority Data

Oct. 14, 1997 [SE] Sweden ................................. 9703743

[51] Int. Cl.$^7$ ....................................................... H04B 7/00
[52] U.S. Cl. ........................... 455/450; 455/511; 455/67.1
[58] Field of Search .................................... 455/446, 450, 455/452, 453, 511, 62, 63, 67.1

[56] References Cited

U.S. PATENT DOCUMENTS

| | | |
|---|---|---|
| 5,239,678 | 8/1993 | Grube et al. . |
| 5,299,198 | 3/1994 | Kay et al. . |
| 5,513,183 | 4/1996 | Kay et al. . |
| 5,729,534 | 3/1998 | Jokinen et al. . |

FOREIGN PATENT DOCUMENTS

| | | |
|---|---|---|
| 3130176 A1 | 4/1985 | Germany . |
| WO 93/10600 | 5/1993 | WIPO . |
| WO 95/19687 | 7/1995 | WIPO . |

*Primary Examiner*—Nguyen Vo
*Assistant Examiner*—Lester G. Kincaid
*Attorney, Agent, or Firm*—Burns, Doane, Swecker & Mathis, L.L.P.

[57] ABSTRACT

This invention relates to methods of initiating a reconfiguration of a cell regarding the number of signalling channels in relation to the number of traffic channels. Each signalling channel (SDCCH/8) contains a number of dedicated control channels (SDCCH). The invention can be divided into two parts, an increase condition in which a traffic channel (TCH) is converted to a signalling channel (SDCCH/8) and a decrease condition in which a signalling channel is reconverted to a traffic channel. These two conditions can be performed independently of each other. In the increase condition, the conversion to a signalling channel is done based on three conditions (1,2,3; FIG. 3) depending on the number of idle dedicated channels (SDCCH) and the number of traffic channels (TCH). In the decrease condition, the conversion (FIG. 4; FIG. 5) is based on the number of signalling channels (SDCCH/8) and the dedicated control channels (SDCCH) in the cell.

7 Claims, 4 Drawing Sheets

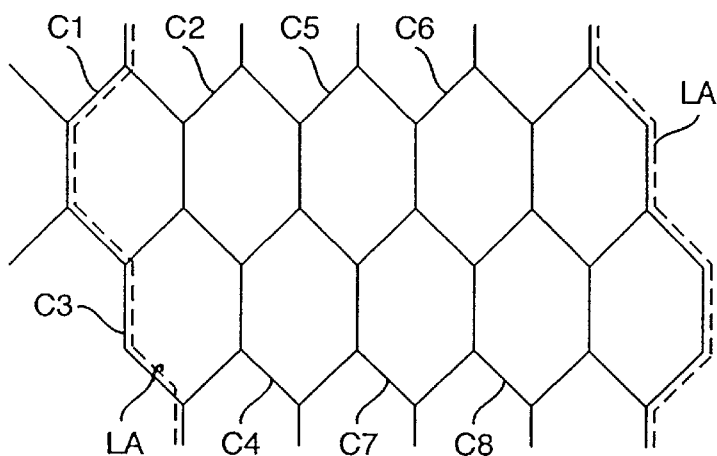
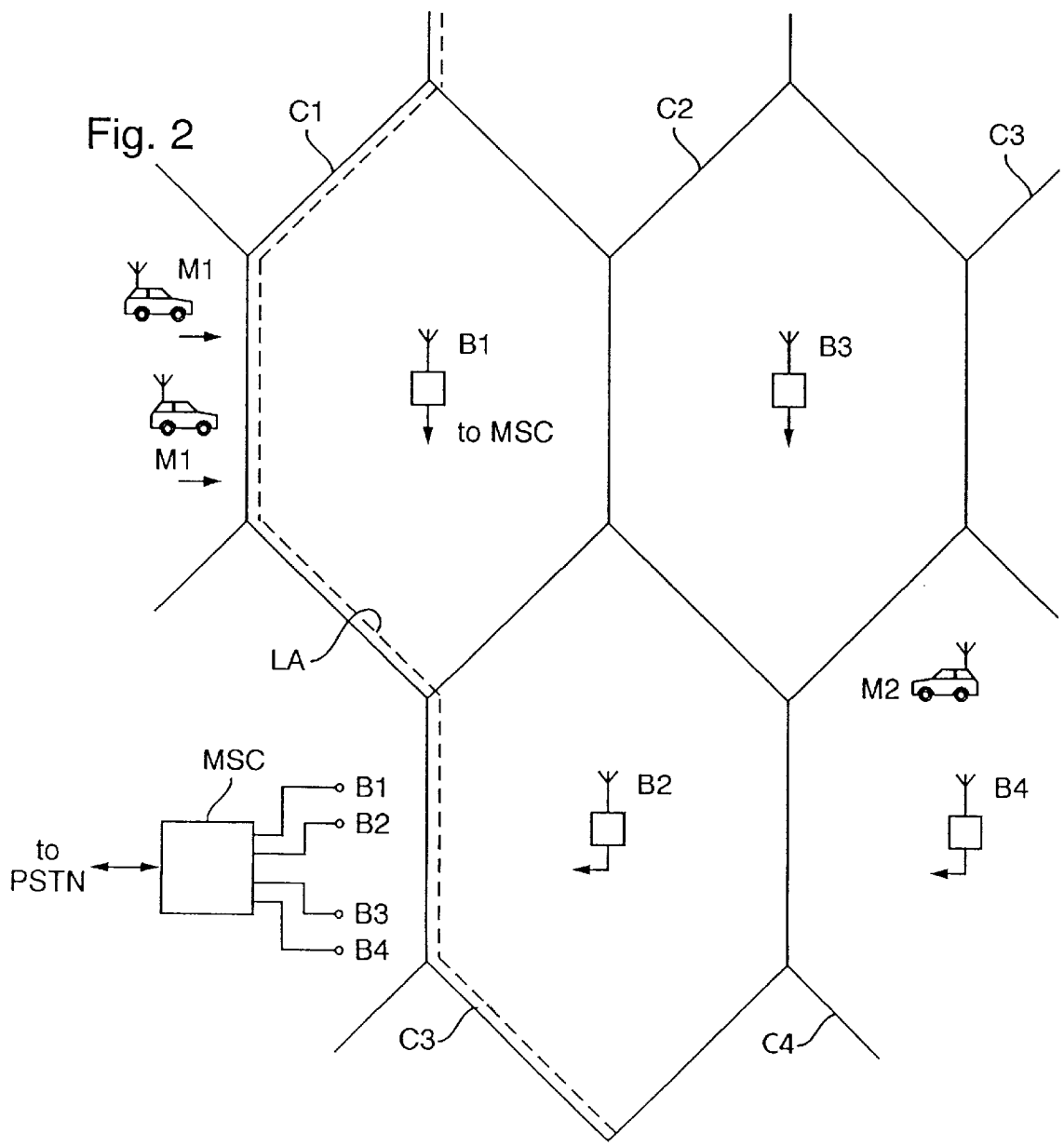

METHODS OF INITIATING A RECONFIGURING OF A CELL IN A MOBILE RADIO NETWORK

TECHNICAL FIELD

The present invention relates to methods of initiating a reconfiguring of a cell in a cellular mobile radio system wherein each cell includes a prescribed minimum number of dedicated control channels (SDCCH) used for signalling and a number of traffic channels (TCH), where a traffic channel can be converted to a dedicated control channel and vice versa.

BACKGROUND OF THE INVENTION

It is previously known in a cellular mobile radio system to reconfigurate a cell by temporarily utilizing an empty traffic channel as a control channel. U.S. Pat No. 5,299,198 and U.S. Pat No. 5,513,183 show a TDMA system in which the number of control channels can be increased by using the traffic channels (see e.g. the Abstract).

WO93/10600 discloses a method of temporarily using a traffic channel as a control channel. The decision for this is made based on comparisons of the traffic density with given threshold values (see the abstract and pages 8, lines 17 to page 9 line 9 and page 15 line 24 to page 17, line 8).

DE 31 30 176 A1 discloses a method in a cellular TDMA-system to convert traffic channels to control channels in dependence on the traffic load. More specific, in dependence on the ratio: number of time slots/number of subscribers in a cell.

SUMMARY OF THE INVENTION

The previously known techniques as e.g. mentioned above to configure the needed number of dedicated control channels, especially the signalling channels in every cell, is based on manually calculating the expected signalling traffic based on traffic models, current traffic distribution and statistics about handovers and congestion rates.

The number of signalling channels is often overdimensioned to avoid congestion. There are ways to overcome short periods of such congestion by using a traffic channel as a signalling channel. This, however, implies the use of a whole time slot instead of using only a fraction of a time slot.

Some cells carry more signalling traffic than others do. Cells at a border of a location area (LA) need more such channels than other cells. This is due to the fact that when a mobile crosses an LA border it is triggered to notify the network about its new location. This is done using a signalling channel and therefore causes heavy load on these channels. Cells with a high amount of SMS traffic do also need more signalling channels than other cells. These factors must be taken into account when dimensioning the number of signalling channels.

When there is congestion on signalling channels, new calls needing signalling channels in order to be set up may use a traffic channel i.e. a whole time slot. The congestion of signalling channels is therefore highly undesireable. This result in that an operator must over-dimension the signalling channels. However since a cell always is given a fixed number of channels (traffic+signalling) the trade-off is fewer channels to be used as traffic channels available to carry the payload. This will seriously affect the operator's revenue.

One object of the present invention is to automatically and dynamically reconfigure a cell in a cellular mobile radio system with new or less signalling channels on demand.

Another object of the present invention is to carry out an automatic reconfiguration on a short term basis in order to take care of the fast fluctuations in the signalling traffic.

These and other objects are met in accordance with the present invention as it appears from the appended claims.

One advantage with the present invention as compared with prior art reconfigurations is that reconfiguration either from a traffic channel to a signalling channel or vice versa is done only in the case signalling channels are needed or not needed and thus that unnecessary reconfiguration in a cell can be avoided.

BRIEF DESCRIPTION OF THE DRAWINGS

The present invention will be described in further detail with reference to the accompanying drawings, where FIG. 1 shows a simplified diagram of a number of cells in a cellular mobile radio system;

FIG. 2 shows an enlarged part of the diagram according to FIG. 1 including mobile stations and base stations;

DESCRIPTION OF PREFERRED EMBODIMENTS

Figure 3:
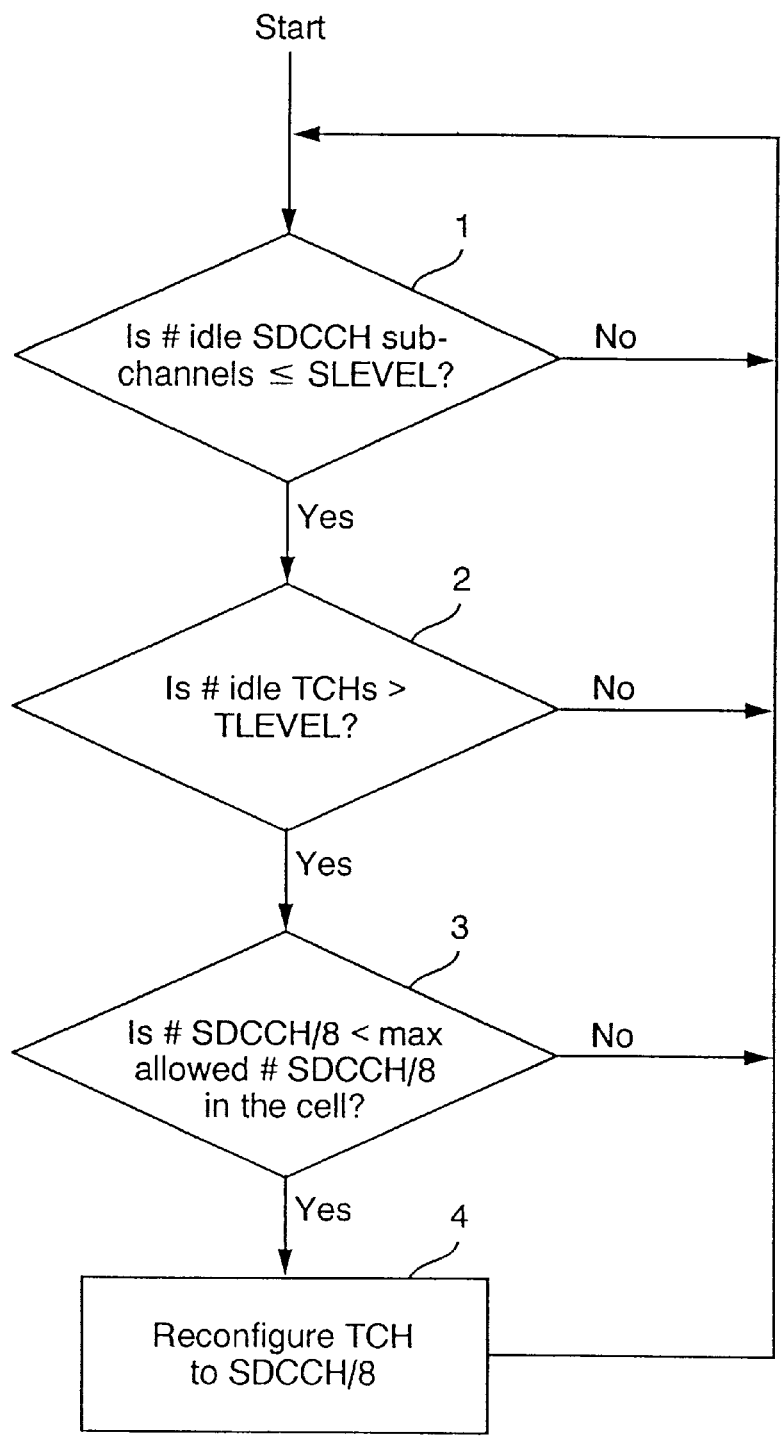
FIG. 3 shows a flow chart of one embodiment of the present invention in the increase condition.

FIG. 1 illustrates in general cells in a cellular mobile radio system known in the art. Each cell has a given number or set of radio channels including the traffic channels and the dedicated control channels. One or more cells can be brought together forming a so called location area LA. When a mobile subscriber is entering such a location area he has to register himself. This requires the use of a dedicated control channel, e.g. in the GSM system, the so called stand alone dedicated control channel SDCCH. The present invention is, however, not limited to the stand alone dedicated control channel SDCCH but can be used whenever a dedicated control channel is to be converted from a traffic channel and converted back to a traffic channel.

FIG. 2 shows more in detail the cells of FIG. 1 and also the base stations B1–B4 serving the four cells C1,C2,C3 and C4. Cells C1 and C3 are situated along the border of the location area L shown in FIG. 1.

A mobile station M1 is outside the location area LA but is moving towards the cell C1 and thus has to register himself while entering the new location area. For that purpose a dedicated control channel has to be available.

Another mobile station M2 is registered in the location area LA and is moving in the cell C4 not in the neighbourhood of border of the location area LA.

In a GSM-system, the stand alone dedicated control channel SDCCH is used by the mobile when it sends or receives an SMS ("Short Message Service") message. A call set-up aiming towards a regular speech or data call will in most cases also use a dedicated control channel as a signalling channel for a short time.

If a greater number of mobile stations are moving towards the border of location area LA it is important that a sufficient number of such control channels can be available in the border cells, in FIG. 2 the cells C1 and C3.

Operators need to configure every cell with the number of signalling channels that can be expected to be used. This is usually done based on experience about the traffic situation and the behaviour in the cell. By the present invention it is not critical to dimension a cell with that number of signalling channels.

The present invention will be described primarily with reference to a GSM-system. As mentioned above the dedicated signalling channel used in such a system is the SDCCH. One time slot is able to carry 8 (or 4) SDCCH subchannels and is therefore referred to as an SDCCH/8 dedicated control channel which thus contains 8 subchannels. A subchannel (corresponding to a signalling channel) is here referred to as an SDCCH subchannel. The method according to the present invention is only valid for time slots carrying an SDCCH/8.

The inventive idea contains two parts.

One part is called the increase condition and implies the configuration of a traffic channel to a signalling channel by dynamically increase the number of signalling channels. In this example the signalling channel is a SDCCH/8.

The other part is called the decrease condition and implies the reconfiguration of an SDCCH/8 back to a traffic channel.

Embodiments of the inventive method will now be described.

FIG. 3 illustrates a flow chart of the increase condition. It consists of a loop with basically three conditions as illustrated by the blocks 1,2 and 3. In the following, a dedicated signalling channel is referred to as an SDCCH subchannel. A traffic channel TCH occupying a whole time slot can thus be configured to 8 SDCCH subchannels.

At first, block 1 in FIG. 3, it is investigated whether the number of idle (i.e. not for the moment utilized) SDCCH subchannels is equal or below the value of a parameter SLEVEL. This parameter defines the number of remaining idle subchannels when an attempt to reconfigure a traffic channel to an SDCCH subchannel in a cell. As an example, this level can be set between 0 and 2.

Parameter SLEVEL can also have the value CONG. This means that this subcondition is fulfilled any time a connection fails to allocate an SDCCH subchannel due to congestion. The connection may instead allocate a TCH for signalling if the Immediate assignment on TCH feature is enabled (see below).

If the answer is "No", nothing is done and the process goes back to "Start" after a certain time determined by the clock in the system.

If "Yes" which implies that the number of SDCCH subchannels are less or equal to the parameter SLEVEL, an investigation of the traffic channels takes place according to block 2. The number of idle traffic channels must be greater than a certain threshold TLEVEL e.g.=4. TLEVEL and SLEVEL can be set arbitrarily by the operator but cannot be set to more than the number of traffic channels and SDCCH channels respectively in the cell.

If the condition in block 2 is fulfilled, "Yes", a third investigation is done according to block 3. In this it is investigated if the number of already defined channels SDCCH/8 is less than the maximum permitted number of channels SDCCH/8 allowed to be configured in the cell.

If the condition regarding the permitted number of channels SDCCH/8 in the cell is fulfilled, "Yes", the loop is completed, block 4, and a reconfiguration of a traffic channel TCH to a signalling channel SDCCH/8 is initiated.

By these three conditions which all must be fulfilled congestion can be reduced.

It is not necessary to perform the different sub-conditions according to blocks 1,2 and 3 in exactly that order given in FIG. 3.

After any reconfiguration (added or removed SDCCH/8:s) that leads to a configuration consisting of more such control channels than the basic SDCCH configuration in the cell, a supervision routine is started. The purpose is to determine whether the added SDCCH/8 is in use or if it should be reconfigured to a traffic channel TCH again. In this way, the inventive method is actively trying to reconfigure back to the basic SDCCH configuration. The time it will take to reach the basic configuration depends on the number of SDCCH/8:s previously added by the inventive method, the value of the parameter STIME and the SDCCH traffic level. Parameter STIME defines the minimum time it will take before a reconfiguration of an SDCCH/8 to a TCH is started.

Figure 4:
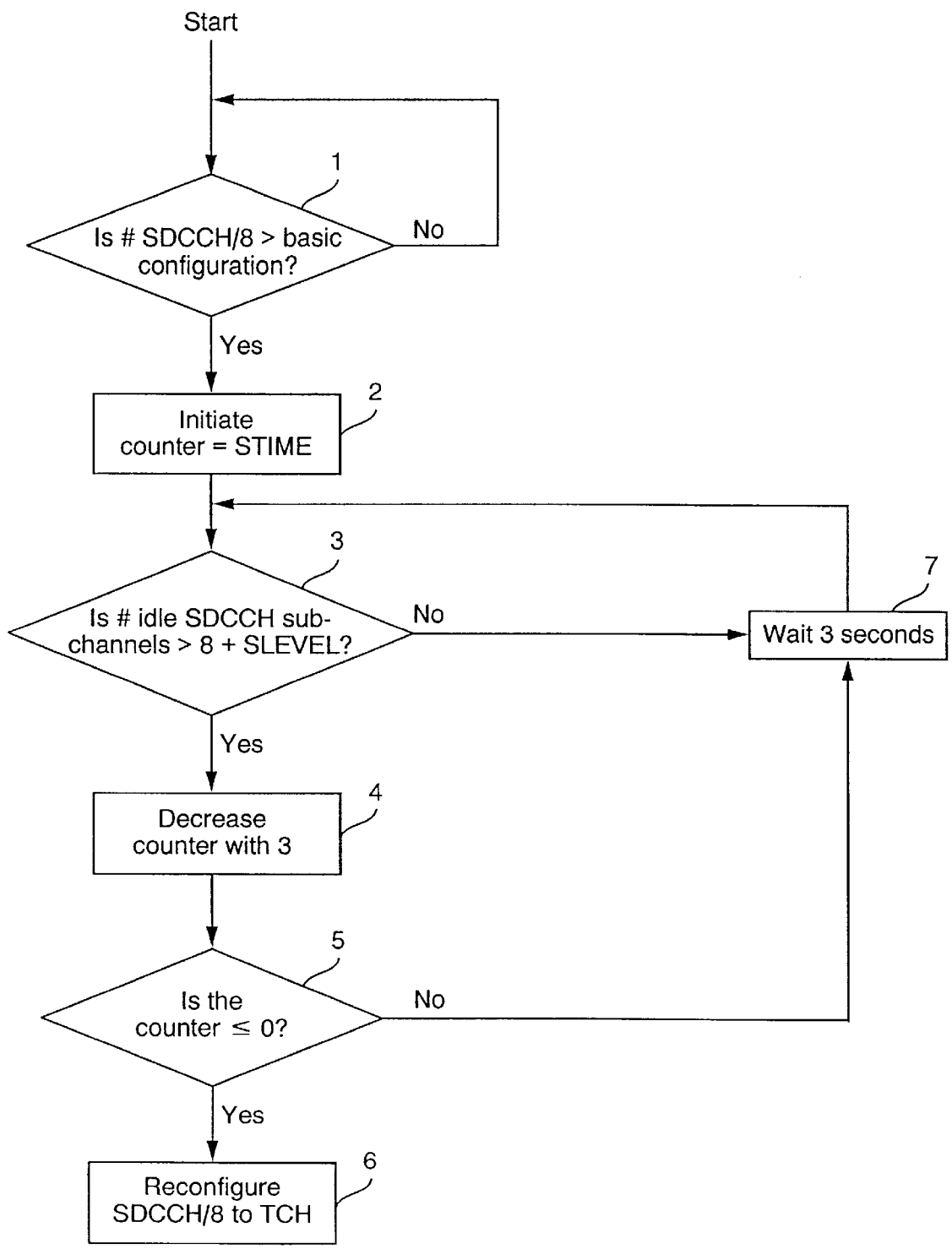
FIG. 4 shows a flow chart of another embodiment of the present invention in the decrease condition.
Figure 5:
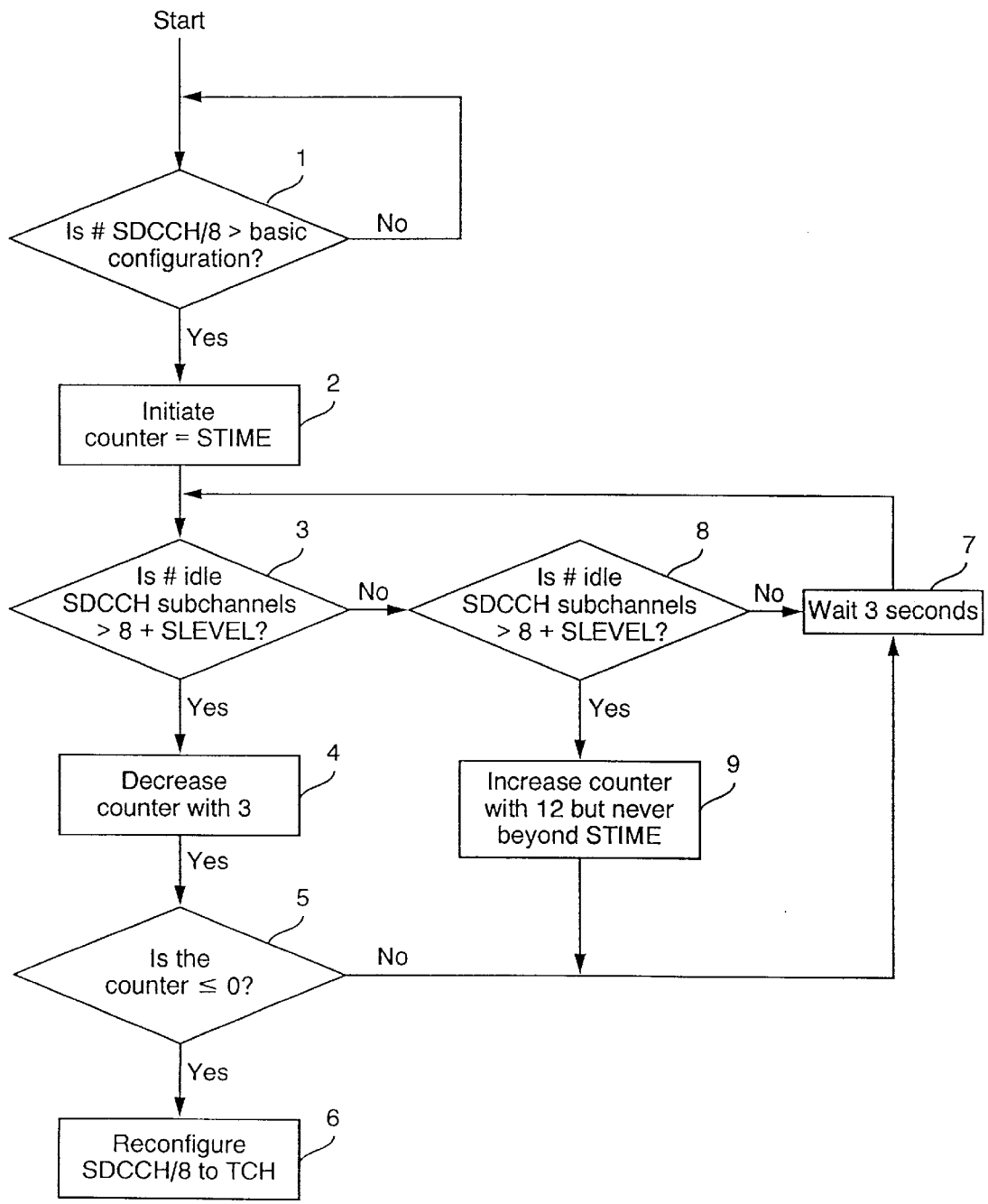
FIG. 5 shows a flow chart of a further embodiment of the present invention in the decrease condition.

The criterion to remove an SDCCH/8 is in the form of a so called "leaky bucket" algorithm as it appears from FIGS. 4 and 5.

FIG. 4 is a flowchart of the decrease condition in accordance with the present invention.

At first it is checked, block 1, whether the number of SDCCH subchannels is greater than the basic configuration.

If "No" then no real increase in signalling channels has taken place.

If "Yes", a counter is initiated with a value equal to the value of parameter STIME. Thereafter a check is made e.g. every third second to see how many idle SDCCH subchannels that are left in the cell. The counter is then decreased according to the block 3,4 in FIG. 4 or both decreased or increased according to the steps, blocks 3,4 or 8,9, respectively according to FIG. 5.

According to FIG. 4, if the total number of idle SDCCH subchannels in the cell is more than 8+SLEVEL ("Yes" at block 3), indicating that the SDCCH traffic load is below the level that initiated the last reconfiguration and that one SDCCH/8 could be removed, the counter is decreased with e.g. 3 steps. The value 3 in this case originates from the fact that the check only is made every third second as mentioned above. Parameter STIME is thus given in seconds. The idle SDCCH subchannels do not have to be on the same timeslot for this condition to be fulfilled.

If the total number of idle SDDCH subchannels in the cell is less than 8+SLEVEL ("No" at block 3 in FIG. 4) indicating that the SDCCH traffic load is above the level that initiated the last reconfiguration there is a delay of e.g. 3 seconds before the investigation according to block 3 again is made. The delay according to block 7 is not necessary, it depends on the loading of the processors in the radio base station controller.

The counter is never increased beyond its initial value, i.e. STIME.

When the counter reaches zero (block 5, "Yes"), a reconfiguration of an SDCCH/8 to a traffic channel TCH is initiated.

In the flow chart of FIG. 5, a further condition has been added, blocks 8 and 9.

If the total number of idle SDCCH subchannels in the cell is less than 8+SLEVEL ("Yes" at block 8 in FIG. 5) indicating that the SDCCH traffic load is above the level that initiated the last reconfiguration, the counter is instead increased with 12 (block 9). However the counter is never increased beyond its initial value, i.e. STIME.

If the total number of idle SDCCH subchannels in the cell is exactly 8+SLEVEL ("No" at block 8) the counter is not stepped at all.

When the counter reaches zero (block 5, "Yes"), a reconfiguration of an SDCCH/8 to a traffic channel TCH is initiated like in the embodiment of FIG. 4. Also here it is not necessary to have the delay of 3 seconds (block 7) but can be another value or zero.

By the increase and decrease conditions, the above mentioned problems regarding the optimal number of signalling channels/traffic channels can be avoided. By this is meant that the problems regarding congestion and overdimensioning of the signalling channels can at least be reduced. The same criterion must be fulfilled for each channel SDCCH/8 to be added to the cell. The channels SDCCH/8:s are added one at a time up to the maximum number of SDCCH/8 in the cell (see block 3).

Channel Reconfiguration.

When a time slot, currently holding a traffic channel TCH is reconfigured to hold an SDCCH/8 it is done without disturbing the ongoing traffic. This means that any TCH traffic on the time slot chosen to hold the SDCCH/8 is handed over to an idle TCH on another time slot. In the same manner is a reconfiguration of an SDCCH/8 to a traffic channel TCH also done without disturbing any ongoing traffic. Any SDCCH traffic on a time slot to be reconfigured to hold a TCH is therefore handed over to idle SDCCH subchannels on the same or other time slots.

Immediate Assignment on Traffic Channel TCH.

During a reconfiguration, when an SDCCH/8 is added in a cell, it is possible that additional requests for SDCCH subchannels arrives. Some of these connections may then experience congestion. To overcome the problem with congestion on SDCCH in those cases, a TCH can be used for a signalling channel (the Immediate assignment on TCH feature). This means that the connections experiencing congestion on SDCCH, before another SDCCH/8 have successfully been added to the cell, may use an idle TCH for the call set-up signalling.

The Immediate assignment on the TCH feature may also be useful if there is congestion on SDCCH and no new SDCCH/8 is allowed to be configured (e.g. if maximum number of SDCCH/8 already is configured in the cell or too few idle TCH channels exist).

What is claimed is:

1. A method of initiating reconfigurating of a cell in a cellular mobile radio system wherein each cell includes a permitted and basic number of dedicated control channels (SDCCH) used for signalling and a number of traffic channels (TCH) and where a traffic channel can be converted to a signalling channel (SDCCH/8) containing a number of said control channels (SDCCH), comprising the steps of a) investigating (1) the number of idle dedicated control channels (SDCCH) in relation to a determined first level (SLEVEL) in a cell;

b) investigating (2) the number of idle traffic channels (TCH) in relation to a determined second level (TLEVEL), c) investigating (3) the number of signalling channels (SDCCH/8) in relation to a permitted number of such channels; and d) based on all of said steps a)–c),taken in an arbitrary order, determining whether a traffic channel is to be converted to a signalling channel (SDCCH/8) in the cell.

2. Method as claimed in claim 1, wherein the steps a) to c) are taken in the following order a) investigating (1; FIG. 3) whether the number of idle dedicated control channels (SDCCH) is less than a determined first level (SLEVEL) in a cell; and if so;

b) investigating (2) whether the number of idle traffic channels (TCH) is greater than a determined second level (TLEVEL), and if so;

c) investigating (3) whether the number of signalling channels (SDCCH/8) is less than a permitted number of such channels (SDCCH/8), and if so;

d) reconfigure a traffic channel to a signalling channel (SDCCH/8).

3. Method as claimed in claim 2, wherein said level (TLEVEL) in step b) is an arbitrary number less than the number of traffic channels (TCH) in the cell.

4. Method as claimed in claim 2, wherein said level in step b) implies the number of transceivers in said cell.

5. A method of initiating reconfigurating of a cell in a cellular mobile radio system wherein each cell includes a permitted number of dedicated control channels (SDCCH) used for signalling and a number of traffic channels (TCH) and where a signalling channel can be converted to a traffic channel (SDCCH/8), comprising the steps of a) investigating (1, FIG. 4) the number of signalling channels (SDCCH/8) in a cell in relation to a basic configuration of such channels, b) investigating (3, FIG. 4) said number of idle dedicated control channels (SDCCH) in relation to a certain level (8+SLEVEL), c) initiating a time counting (2,4; FIG. 4) if the number of such channels is greater than the basic configuration, decreasing the counter with a certain amount of steps if the number of idle SDCCH subchannels exceeds a certain level (8+SLEVEL), and reconfigure a signalling channel (SDCCH/8) back to a traffic channel if the time counting has reached a certain value (5,6); while if d) the number of such channels is less than said certain level (8+SLEVEL), step c) is repeated after a certain time delay.

6. A method as claimed in claim 5, including the further step of e) investigating whether the number of idle subchannels (SDCCH) is less than said certain level (8+SLEVEL) and if "Yes" increase the time counting with a determined number of steps.

7. A method as claimed in claim 5, including the further step of e) investigating whether the number of idle subchannels (SDCCH) is less than said certain level (8+SLEVEL) and if "No" implying that the number is equal to said permitted number, performing said step c).

* * * * *